United States Patent
Baumann et al.

(10) Patent No.: US 6,960,859 B2
(45) Date of Patent: Nov. 1, 2005

(54) ROEBEL BAR FOR AN ELECTRICAL MACHINE AND METHOD FOR PRODUCING SUCH A ROEBEL BAR

(75) Inventors: Thomas Baumann, Wettingen (CH); Peter Klee, Mannheim (DE)

(73) Assignee: Alstom Technology LTD, Baden (CH)

(*) Notice: Subject to any disclaimer, the term of this patent is extended or adjusted under 35 U.S.C. 154(b) by 0 days.

(21) Appl. No.: 10/768,124

(22) Filed: Feb. 2, 2004

(65) Prior Publication Data

US 2005/0029893 A1 Feb. 10, 2005

(30) Foreign Application Priority Data

Feb. 1, 2003 (DE) .......................................... 103 04 025

(51) Int. Cl.[7] ................................................. H02K 3/14
(52) U.S. Cl. ......................... 310/196; 310/45; 174/127; 156/52
(58) Field of Search .......................... 310/45, 196, 215; 174/DIG. 19–DIG. 20, DIG. 26, DIG. 31, DIG. 33, 113, 120 SC, 116–118, 127, 126.4; 156/47, 51, 53–55

(56) References Cited

U.S. PATENT DOCUMENTS

| | | | | |
|---|---|---|---|---|
| 3,723,797 A | * | 3/1973 | Andersson et al. | 310/196 |
| 4,163,166 A | * | 7/1979 | Kamiya et al. | 310/215 |
| 4,318,020 A | * | 3/1982 | Meyer | 310/215 |
| 4,365,177 A | * | 12/1982 | Madsen | 310/61 |
| 4,560,896 A | * | 12/1985 | Vogt et al. | 310/215 |
| 5,623,174 A | * | 4/1997 | Markovitz et al. | 310/45 |
| 5,760,516 A | | 6/1998 | Baumann et al. | |
| 5,771,563 A | * | 6/1998 | Meier et al. | 29/596 |
| 6,420,812 B1 | | 7/2002 | Emery | |
| 6,663,816 B2 | * | 12/2003 | Younsi et al. | 264/272.2 |
| 6,724,118 B2 | * | 4/2004 | Emery | 310/215 |

FOREIGN PATENT DOCUMENTS

| | | |
|---|---|---|
| DE | 942 289 | 5/1956 |
| DE | 198 60 412 A1 | 6/2000 |
| EP | 0 774 823 A1 | 5/1997 |
| EP | 1 267 472 A2 | 12/2002 |
| JP | 02294242 A * | 12/1990 ............ H02K/3/40 |

* cited by examiner

Primary Examiner—Burton Mullins
(74) Attorney, Agent, or Firm—Cermak & Kenealy, LLP; Adam J. Cermak

(57) ABSTRACT

A Roebel bar (10) for an electrical machine comprises a plurality of essentially parallel, transposed conductor elements (11, 12, 13), which, lying over and/or next to one another, form a bar with an essentially rectangular cross section, which is surrounded on the outside by an insulation (19) and has between the insulation (19) and the conductor elements (11, 12, 13) means (14, 14'; 15, 15'; 17, 18) for forming an inner corona protection (ICP).

In the case of such a Roebel bar, particularly effective inner corona protection is achieved by the fact that the means for inner corona protection comprise preformed, angled profiles (17, 18) of an electrically conducting material, which, running in the longitudinal direction of the Roebel bar (10), enclose the edges of the bar formed by the conductor elements (11, 12, 13), and to which the insulation (19) is applied.

36 Claims, 7 Drawing Sheets

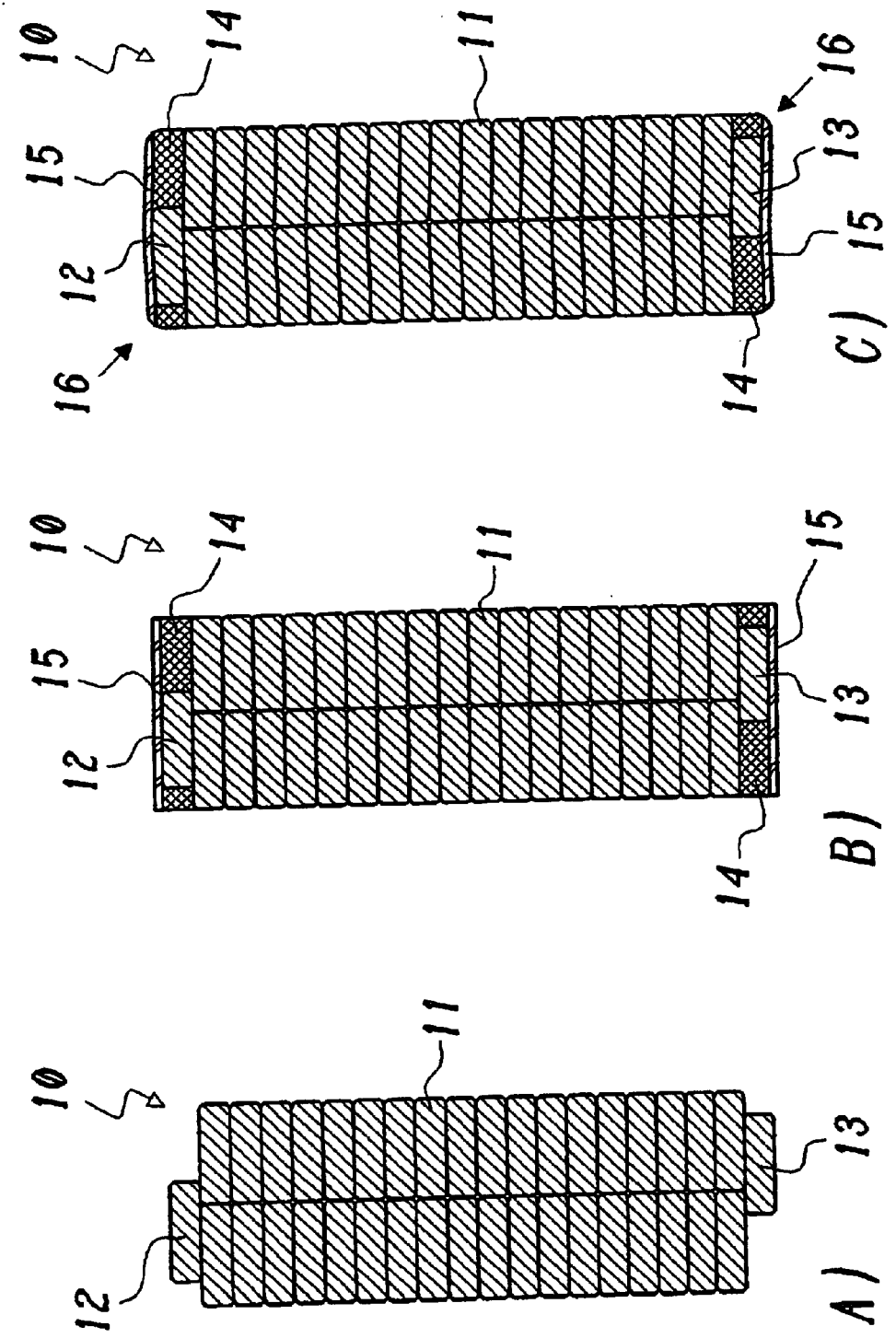

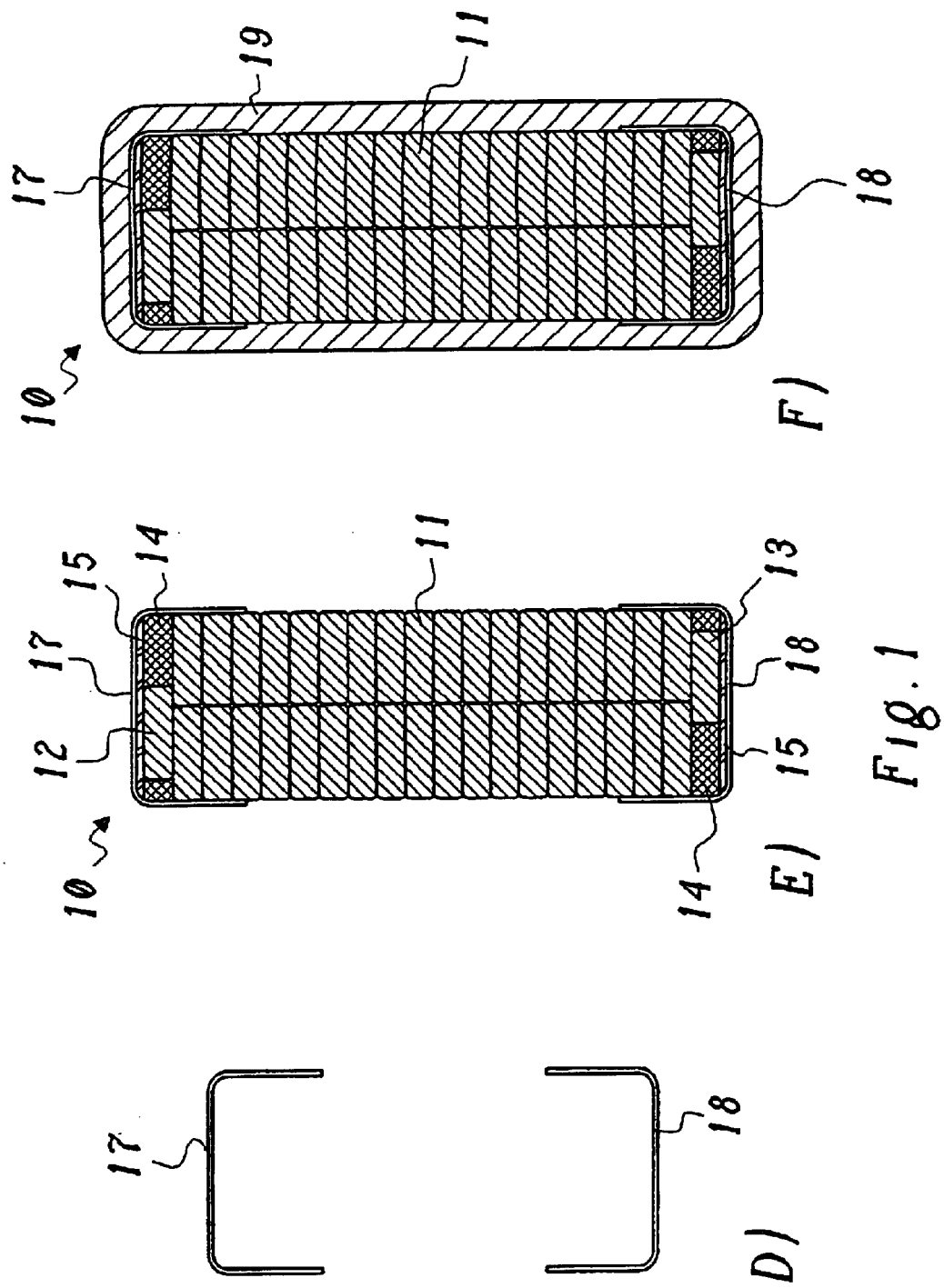

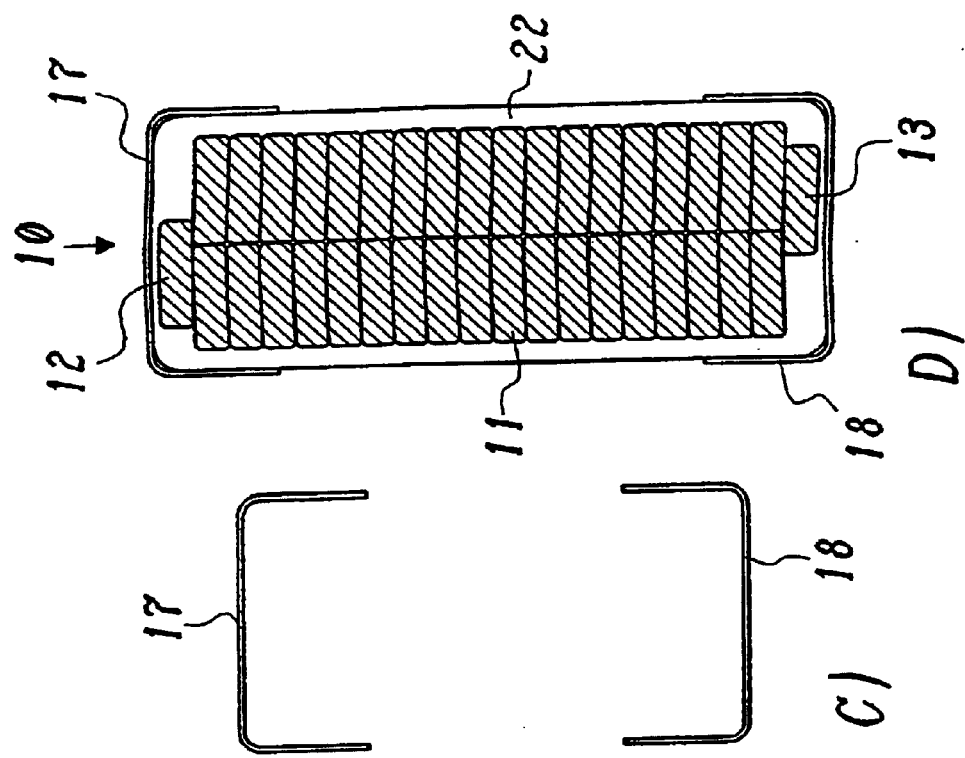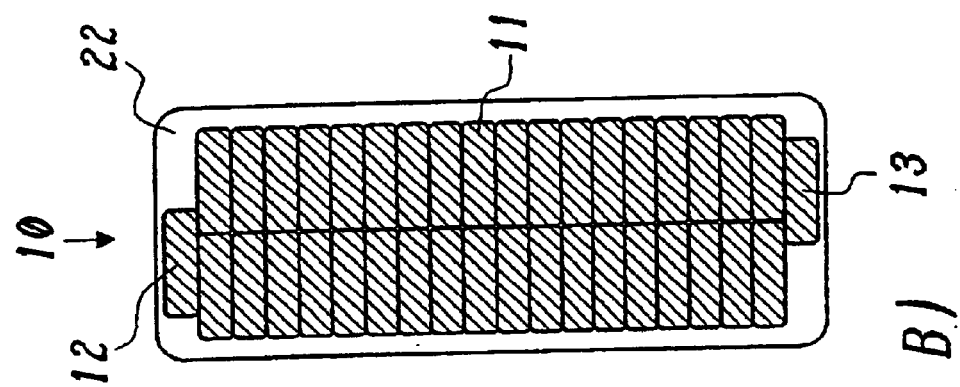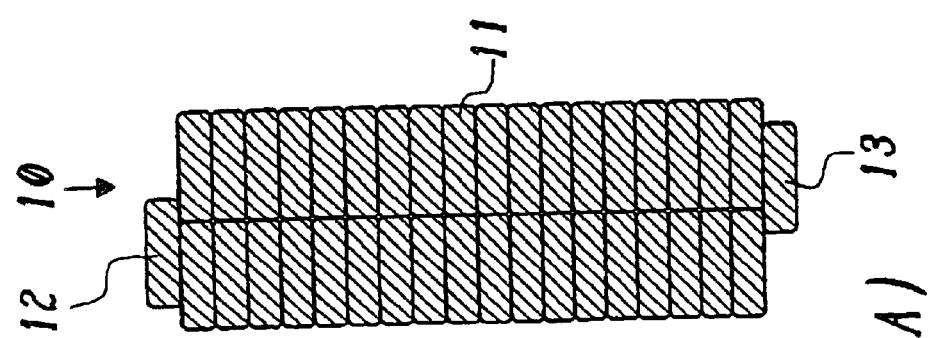
Fig. 5

ROEBEL BAR FOR AN ELECTRICAL MACHINE AND METHOD FOR PRODUCING SUCH A ROEBEL BAR

TECHNICAL FIELD

The present invention relates to the field of electrical machines. It concerns a Roebel bar for an electrical machine according to the preamble of claim 1 and a method for producing such a Roebel bar.

PRIOR ART

Such a Roebel bar is known for example from EP-A1-0 774 823 and U.S. Pat. No. 5,760,516.

The stator windings of large electrical machines comprise winding bars which are placed in slots, are constructed from a multiplicity of parallel conductor elements and have an essentially rectangular cross section, the narrow sides of which form the upper side and underside of the bar. The individual conductor elements of the winding bars are transposed in a special way, i.e. they exchange places within the bar over the length of the bar, to suppress currents of the conductor elements. Such winding bars have long been known by the term "Roebel bars".

Owing to the dielectric inhomogeneity on the narrow bar side of Roebel bars, it is necessary in the case of relatively high operating field strengths to use a so-called inner corona protection (ICP), which has the task of "covering" these inhomogeneities by an equipotential surface, and consequently of neutralizing them with respect to dielectric effectiveness.

There are in principle 2 ways of doing this in the prior art:
1. By wrapping tapes of a conductive material around the complete bar (and consequently also the critical narrow bar sides with the transposition points of the conductor elements)—so-called "closed" IPC (see in this respect FIG. 4 of U.S. Pat. No. 6,420,812).

Disadvantages:

The offset edges of the tape (overlapping points) produce dielectric inhomogeneities, which lead to highly excessive field intensities, specifically in the region of the bar edges (where the background electric field is in any case already about twice as high as on the wide sides).

2. By "covering" only the critical regions (that is the narrow bar sides) with conductive materials (laminated glass fabric LGF, electrically conducting mastic) and, if need be, additionally producing a defined edge radius mechanically (milling, grinding) (see in this respect the initially cited EP-A1-0 774 823).

Disadvantages:

Such mechanical working (to produce a defined radius) has quite a large production tolerance, sometimes causing considerable deviations from the intended radius. The materials used (electrically conducting mastic, but in particular LGF) are not homogeneous (glass fibers), with the result that, at least in the micro-range, the mechanical working creates extreme inhomogeneities (protruding glass fibers, breakouts, voids, etc.). This has the overall effect that the theoretical potential for minimizing the field strength cannot be anywhere near exploited. For example, in the case of an increase of the edge radius of 0.5→2.5 mm, only an exploitable insulation thickness reduction of approximately 10% is obtained, although the "theoretical potential" is likely to be many times higher.

SUMMARY OF THE INVENTION

It is therefore the object of the invention to provide a Roebel bar which avoids the enumerated disadvantages of known bars and is distinguished in particular by an inner corona protection which can be applied in a simple and flexible way and is particularly effective, and also a method for producing it.

The object is achieved by the totality of the features of claims 1 and 15.

The starting point of the invention was to find a technical solution that allows the theoretical potential for field strength minimization to be exploited far better, by minimizing the technologically inherent, dielectrically effective "defects" at the edge radius of the bar.

The essence of the invention is to produce the radii of the bar edges not by mechanical working but instead by using prefabricated, angled, in particular U-shaped, profiles. Such profiles can be produced as endless material, for example from commercially available electrically conductive prepreg materials, by the hot-pressing method. Prepreg material is a woven fabric preimpregnated with a resin-catalyst mix. Prepreg materials of the stated type are commercially obtainable for example under the designation PREPREG GGBE from the German company August Krempel Soehne GmbH+Co, KG, Vaihingen.

The method of "endless" profile production is known and is used for example for producing rotor slot channels.

By means of hot pressing, the intended radius can be technically realized in an almost ideal manner.

A further possibility would be to produce such profiles by the extrusion method with electrically conductive thermoplastic or elastomeric materials.

A third possibility would be to produce such profiles by the pultrusion method with electrically conductive prepregs (such profiles are obtainable for example from the aforementioned company Krempel under the trade name WACOSIT-R.).

By using profiles which cover the entire length of the straight part of the Roebel bar, all the mechanical discontinuities (and consequently additional excessive electric field intensities) in the region of the bar edges are avoided. In the case of U profiles, the legs of the profile must be chosen to be sufficiently long (typically 5–10 mm), with the result that the offset edges of the profiles come to lie on the wide sides of the bars, which are subjected to less electrical loading. It is in principle also possible to choose the leg length to be so great that the two U profiles overlap in the middle of the bar width.

In principle, it is conceivable to cover each of the edges of the Roebel bar with a separate, rectangular profile. A refinement of the invention that is preferred because of its simplicity is distinguished, however, by the fact that the profiles are formed as twice-angled U profiles and reach around the bar formed by the conductor elements from opposite sides, in particular from the narrow sides. In this way, all the edges can be covered with only two U profiles, the U profiles being easily able to be fitted securely onto the bar.

As already mentioned, the preformed profiles or U profiles may be produced either from an electrically conductive prepreg material by a hot-pressing method, or from an electrically conductive prepreg material by a pultrusion method, or from an electrically conductive thermoplastic or elastomeric material by an extrusion method.

Since the full effect of the profiles is already achieved with very low wall thicknesses, it is advantageous from the aspect of expenditure in production and on material if the profiles or U profiles have a wall thickness of less than 1 mm, preferably between 0.1 mm and 0.2 mm.

It has been found to be particularly favorable if the profiles or U profiles have in this case in their angled regions a radius of curvature of a few millimeters, preferably in the range between 0.5 mm and 2.5 mm, and if the profiles are formed as twice-angled U profiles with legs which have a length of several millimeters, preferably approximately 5–10 mm.

There are various possibilities within the scope of the invention for preparing the Roebel bar to receive the profiles. One possibility is characterized in that the Roebel bar is provided underneath the profiles or U profiles with electrically conducting mastic and placed-on strips of laminated glass fabric, the profiles or U profiles being loosely placed on in particular, and the edges lying underneath the profiles or U profiles being rounded by working.

However, it is also conceivable for the profiles or U profiles to be joined to the electrically conducting mastic and the placed-on strips by hot pressing.

Another possibility is that the Roebel bar is provided underneath the profiles or U profiles with electrically conductive prepreg material, and that the profiles or U profiles are joined to the prepreg material by hot pressing.

A further possibility is that the profiles or U profiles are loosely placed onto the hot-pressed bar formed by the conductor elements.

It is also conceivable, however, that the bar formed by the conductor elements is wrapped with an electrically conductive tape, and that the profiles or U profiles are loosely placed onto the wrapped bar.

A preferred refinement of the method according to the invention is distinguished by the fact that the profiles or the U profiles are loosely placed or fitted onto the bar, the bar being hot-pressed with electrically conducting mastic and placed-on strips of laminated glass fabric and the edges rounded by working, or the bar being wrapped with a conductive tape, before the profiles are placed or fitted on.

Another preferred refinement of the method according to the invention is distinguished by the fact that the profiles or the U profiles are hot-pressed with the bar, with electrically conducting mastic and strips of laminated glass fabric or electrically conducting prepreg material being arranged between the profiles or U profiles and the bar for the hot pressing.

Further embodiments emerge from the dependent claims.

BRIEF EXPLANATION OF THE FIGURES

The invention is to be explained in more detail below on the basis of exemplary embodiments in conjunction with the drawing, in which:

FIG. 1 shows in various subfigures 1A to 1F in a cross-sectional representation various steps in the production of a Roebel bar according to a first preferred exemplary embodiment of the invention with loosely placed-on U profiles for covering the previously round-worked bar edges;

FIG. 5 shows in various subfigures 5A to 5D in a representation comparable to FIG. 1 various steps in the production of a Roebel bar according to a fifth preferred exemplary embodiment of the invention, in which the bar is wrapped with conductive tape before the U profiles are placed on.

WAYS OF IMPLEMENTING THE INVENTION

Figure 2:
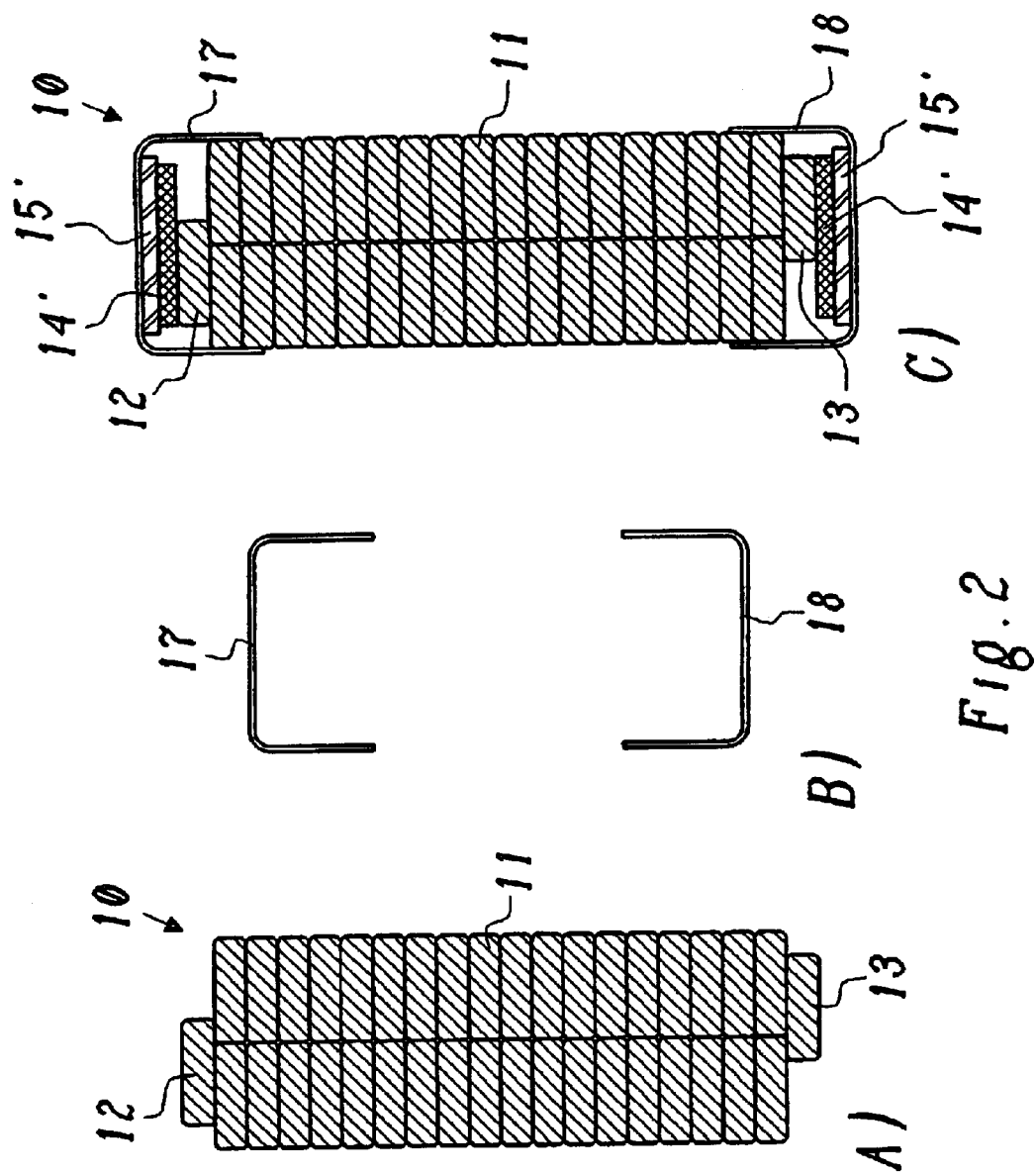
FIG. 2 shows in various subfigures 2A to 2E in a representation comparable to FIG. 1 various steps in the production of a Roebel bar according to a second preferred exemplary embodiment of the invention with hot-pressed U profiles using electrically conducting mastic and LGF strips.
Figure 2:
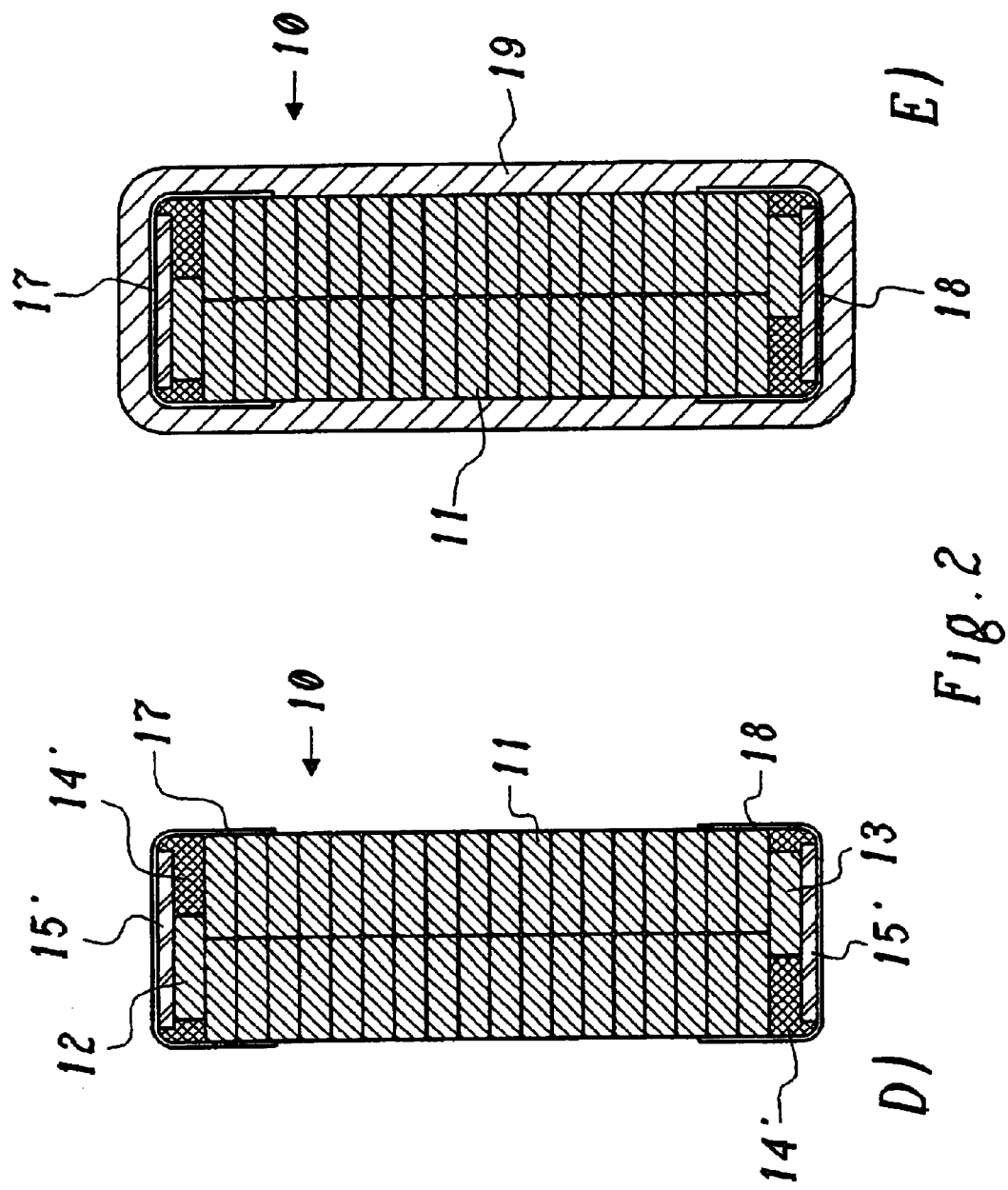

In FIG. 1, various steps in the production of a Roebel bar according to a first preferred exemplary embodiment of the invention are shown in several subfigures 1A to 1F in a cross-sectional representation. Taken as a basis is a Roebel bar 10, which is formed by a multiplicity of conductor elements 11, 12 and 13, which are transposed in the customary way for Roebel transposition. The transposition is evident from the conductor elements 12 and 13 running outside the two conductor element stacks on the upper and lower narrow sides of the Roebel bar 10 (FIG. 1A).

The irregularities on the narrow sides of the bar produced by the Roebel transposition are then evened out—as described in the initially cited EP-A1-0 774 823—according to FIG. 1B by hot pressing by means of electrically conducting mastic 14 and conductive strips 15 placed over it. The filling material "ERKITT" of the Krempel company can be used for example as the electrically conducting mastic. On the hot-pressed bar (the so-called "green bar"), rounded edges 16 are then produced according to FIG. 1C by mechanical grinding. The radius of curvature of the rounded edges 16 is then for example 2.5 mm.

Then, according to FIG. 1D, two U profiles 17, 18 are placed onto the green bar prepared in this way, from the narrow sides (FIG. 1E). The U profiles 17, 18 placed or fitted on before the insulation only serve the purpose of creating a smooth finish for the radius region at the edges, or covering inhomogeneities produced by the mechanical working. The green bar with the fitted-on U profiles 17, 18 can be provided in a customary way with an insulation 19 (FIG. 1F).

The U profiles 17, 18 are preformed profiles which are produced from an electrically conductive prepreg material by a hot-pressing method or from an electrically conductive prepreg material by a pultrusion method or from an electrically conductive thermoplastic material by an extrusion method (the use of electrically conductive elastomeric materials, such as for example silicone, Viton® or the like, is also conceivable). They have a wall thickness of less than 1 mm, preferably between 0.05 mm and 0.2 mm. They have in their angled regions a radius of curvature of a few millimeters, preferably in the range between 0.5 mm and 2.5 mm. They have two legs, which have a length of several millimeters, preferably approximately 5–10 mm.

In FIG. 2, various steps in the production of a Roebel bar according to a second preferred exemplary embodiment of the invention are represented in various subfigures 2A to 2E in a representation comparable to FIG. 1. Taken again as a basis is a Roebel bar 10 according to FIG. 2A, which is identical to the Roebel bar from FIG. 1A. Unlike in the exemplary embodiment of FIG. 1, here, according to FIG. 2B, the attachment of the U profiles 17, 18 is integrated into the hot-pressing process of the green bar.

For this purpose, according to FIG. 2C, conductive strips 15' of LGF and electrically conducting mastic 14' are respectively placed in the U profiles 17, 18 for the filling and coupling. The thickness of the strips 15' corresponds approximately to the radius at the edges of the U profiles 17, 18. The formations 14', 15', 17, 18 are placed on the green bar before the hot pressing (FIG. 2C). The amount of electrically conducting mastic 14' is dimensioned such that no mastic escapes from the ends of the legs of the U profiles 17, 18 during the hot pressing. The green bar with the placed-on U profiles 17, 18 is then hot-pressed (FIG. 2D) and can then in turn be provided with an insulation 19 (FIG. 2E).

Figure 3:
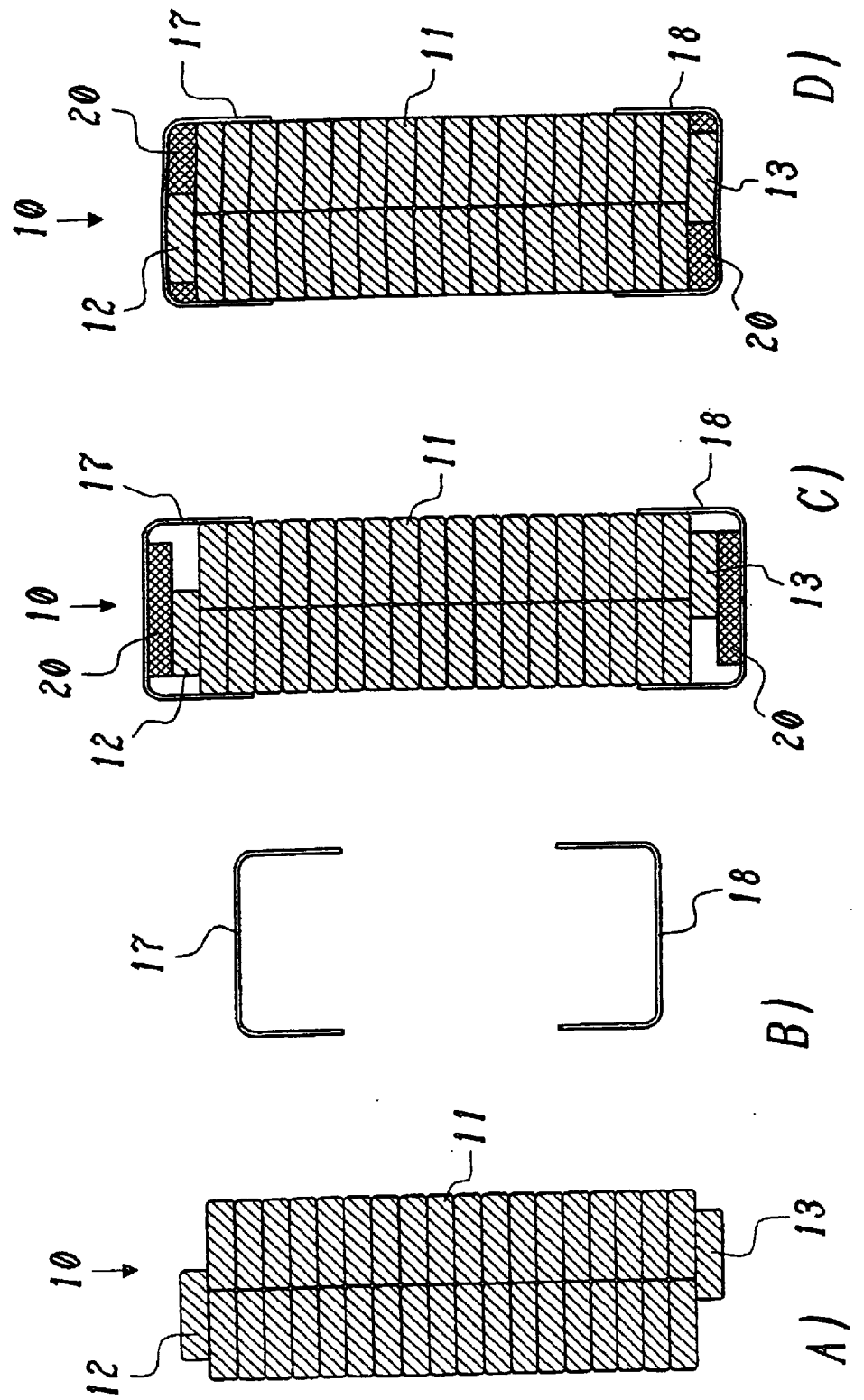
FIG. 3 shows in various subfigures 3A to 3D in a representation comparable to FIG. 1 various steps in the production of a Roebel bar according to a third preferred exemplary embodiment of the invention with hot-pressed U profiles using electrically conductive prepreg materials.

In FIG. 3, various steps in the production of a Roebel bar according to a third preferred exemplary embodiment of the invention are shown in various subfigures 3A to 3D in a representation comparable to FIG. 1. The method proceeds in a way similar to in FIG. 2, with the exception that, instead of the electrically conducting mastic 14' and the conductive LGF strip 15', now electrically conductive prepreg 20 is placed into the U profiles 17, 18 (FIG. 3C) and is hot-pressed, including the U profiles 17, 18, with the bar. After the hot pressing, the insulation takes place as in FIG. 1F and FIG. 2E.

Figure 4:
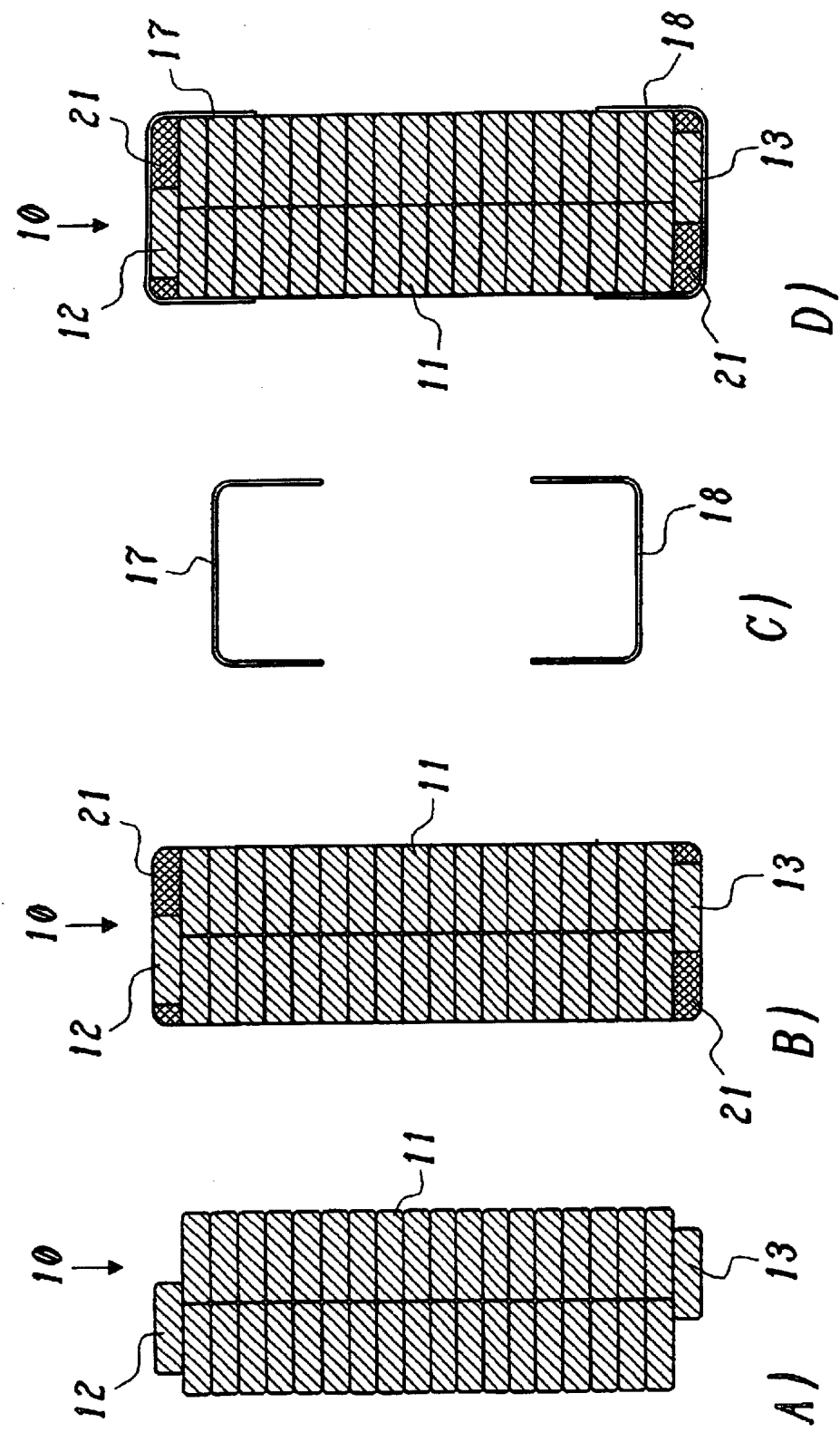
FIG. 4 shows in various subfigures 4A to 4D in a representation comparable to FIG. 1 various steps in the production of a Roebel bar according to a fourth preferred exemplary embodiment of the invention with U profiles loosely placed on the fired bar.

In FIG. 4, various steps in the production of a Roebel bar according to a fourth preferred exemplary embodiment of the invention are shown in various subfigures 4A to 4D in a representation comparable to FIG. 1. Here, firstly the green bar is fired in the hot press without crossover packing (with electrically conducting mastic 21) (FIG. 4B), only low pressure being required on the conductor element column, since no mastic has to be pressed in. This has the further advantage that pressing to a defined final dimension can be performed without great pressure, even in the case of relatively great conductor element tolerances. The U profiles 17, 18 (FIG. 4C) are only fitted on before the insulation (FIG. 4D). The insulation takes place as in FIG. 1F or 2E.

In FIG. 5, finally, various steps in the production of a Roebel bar according to a fifth preferred exemplary embodiment of the invention, which manages without hot pressing, are represented in various subfigures 5A to 5D in a representation comparable to FIG. 1. The Roebel bar 10 according to FIG. 5A is firstly wrapped in its slot part with an electrically conductive tape 22 and provided in this way with its required stability for the transport to the bending machine and for the insulation. Then, the U profiles 17, 18 according to FIG. 5C are fitted on (FIG. 5D). The insulation then takes place again as in FIG. 1F or 2E. This method variant combines a closed ICP (tape) with a smooth edge radius (U profile).

LIST OF REFERENCE NUMERALS

10 Roebel bar
11, 12, 13 conductor element
14, 14' electrically conducting mastic
15, 15' strip (LGF)
16 rounded edge
17, 18 U profile
19 insulation
20 prepreg (conductive)
21 electrically conducting mastic
22 tape (conductive)

What is claimed is:

1. A Roebel bar for an electrical machine, the Roebel bar comprising:
   a plurality of essentially parallel, transposed conductor elements lying over one another, next to one another, or both, the conductor elements forming a bar with an essentially rectangular cross section;
   an insulation surrounding said bar on the outside; and
   means for forming an inner corona protection positioned between the insulation and the conductor elements, the means for inner corona protection comprising preformed, angled profiles of an electrically conducting material running in the longitudinal direction of the Roebel bar, the profiles enclosing the edges of said bar, and the insulation being applied to the profiles.

2. The Roebel bar as claimed in claim 1, wherein the profiles comprise twice-angled U profiles and reach around the bar formed by the conductor elements from opposite sides.

3. The Roebel bar as claimed in claim 2, wherein the profiles reach around the bar formed by the conductor elements from the narrow sides.

4. The Roebel bar as claimed in claim 2, wherein the U profiles are formed by a method selected from the group consisting of hot-pressing an electrically conductive prepreg material, pultrusion of an electrically conductive prepreg material, and extrusion of an electrically conductive thermoplastic or elastomeric material.

5. The Roebel bar as claimed in claim 2, wherein the U profiles have a wall thickness of less than 1 mm.

6. The Roebel bar as claimed in claim 5, wherein the wall thickness is between 0.05 mm and 0.2 mm.

7. The Roebel bar as claimed in claim 2, wherein the U profiles have angled regions with a radius of curvature of between 0.5 mm and 2.5 mm.

8. The Roebel bar as claimed in claim 2, further comprising:
   electrically conducting mastic and placed-on strips of laminated glass fabric underneath the U profiles.

9. The Roebel bar as claimed in claim 8, wherein the U profiles are loosely placed on, and comprising rounded edges underneath the profiles.

10. The Roebel bar as claimed in claim 8, wherein the U profiles are joined to the electrically conducting mastic and the placed-on strips by hot pressing.

11. The Roebel bar as claimed in claim 2, further comprising:
    electrically conductive prepreg material underneath the U profiles, and the U profiles are joined to the prepreg material by hot pressing.

12. The Roebel bar as claimed in claim 2, wherein the U profiles are loosely placed onto a hot-pressed bar formed by the conductor elements.

13. The Roebel bar as claimed in claim 2, further comprising:
    electrically conductive tape wrapped around the bar formed by the conductor elements to form a wrapped bar; and
    wherein the U profiles are loosely placed onto the wrapped bar.

14. The Roebel bar as claimed in claim 1, wherein the preformed profiles are formed by a method selected from the group consisting of hot-pressing an electrically conductive prepreg material, pultrusion of an electrically conductive prepreg material, and extrusion of an electrically conductive thermoplastic or elastomeric material.

15. The Roebel bar as claimed in claim 1, wherein the profiles have a wall thickness of less than 1 mm.

16. The Roebel bar as claimed in claim 15, wherein the wall thickness is between 0.05 mm and 0.2 mm.

17. The Roebel bar as claimed in claim 1, wherein the profiles have angled regions with a radius of curvature of between 0.5 mm and 2.5 mm.

18. The Roebel bar as claimed in claim 1, wherein the profiles comprise twice-angled U profiles with legs having a length of approximately 5–10 mm.

19. The Roebel bar as claimed in claim 1, further comprising:
electrically conducting mastic and placed-on strips of laminated glass fabric underneath the profiles.

20. The Roebel bar as claimed in claim 19, wherein the profiles are loosely placed on, and comprising rounded edges underneath the profiles.

21. The Roebel bar as claimed in claim 19, wherein the profiles are joined to the electrically conducting mastic and the placed-on strips by hot pressing.

22. The Roebel bar as claimed in claim 1, further comprising:
electrically conductive prepreg material underneath the profiles, and the profiles are joined to the prepreg material by hot pressing.

23. The Roebel bar as claimed in claim 1, wherein the profiles are loosely placed onto a hot-pressed bar formed by the conductor elements.

24. The Roebel bar as claimed in claim 1, further comprising:
electrically conductive tape wrapped around the bar formed by the conductor elements to form a wrapped bar; and
wherein the profiles are loosely placed onto the wrapped bar.

25. A method for producing a Roebel bar as claimed in claim 1, the method comprising:
covering the bar formed by the conductor elements at edges of the bar with preformed, angled profiles before application of the insulation surrounding the bar.

26. The method as claimed in claim 25, comprising:
loosely placing or fitting the profiles onto the bar.

27. The method as claimed in claim 26, further comprising:
hot-pressing the bar with electrically conducting mastic and placed-on strips of laminated glass fabric; and
rounding by working the edges before the profiles are placed or fitted on.

28. The method as claimed in claim 26, further comprising:
wrapping the bar with a conductive tape before the profiles are placed or fitted on.

29. The method as claimed in claim 25, further comprising:
hot-pressing the profiles with the bar.

30. The method as claimed in claim 29, further comprising:
positioning electrically conducting mastic and strips of laminated glass fabric or electrically conducting prepreg material between the profiles and the bar for said hot pressing.

31. The method as claimed in claim 25, wherein covering comprises covering the bar with preformed, angled U profiles.

32. The method as claimed in claim 31, comprising:
loosely placing or fitting the U profiles onto the bar.

33. The method as claimed in claim 32, further comprising:
hot-pressing the bar with electrically conducting mastic and placed-on strips of laminated glass fabric; and
rounding by working the edges before the U profiles are placed or fitted on.

34. The method as claimed in claim 32, further comprising:
wrapping the bar with a conductive tape before the U profiles are placed or fitted on.

35. The method as claimed in claim 31, further comprising:
hot-pressing the U profiles with the bar.

36. The method as claimed in claim 35, further comprising:
positioning electrically conducting mastic and strips of laminated glass fabric or electrically conducting prepreg material between the U profiles and the bar for said hot pressing.

* * * * *